United States Patent
Wang et al.

(10) Patent No.: US 12,452,742 B2
(45) Date of Patent: Oct. 21, 2025

(54) GATEWAY HANDOVER METHOD AND APPARATUS

(71) Applicant: HUAWEI TECHNOLOGIES CO., LTD., GuangDong (CN)

(72) Inventors: Xiaolu Wang, Hangzhou (CN); Hejia Luo, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 602 days.

(21) Appl. No.: 17/886,028

(22) Filed: Aug. 11, 2022

(65) Prior Publication Data

US 2022/0386185 A1 Dec. 1, 2022

Related U.S. Application Data

(63) Continuation of application No. PCT/CN2021/074277, filed on Jan. 29, 2021.

(30) Foreign Application Priority Data

Feb. 13, 2020 (CN) .......................... 202010095050.8

(51) Int. Cl.
*H04W 56/00* (2009.01)
*H04W 36/00* (2009.01)

(52) U.S. Cl.
CPC ... *H04W 36/0058* (2018.08); *H04W 36/0061* (2013.01); *H04W 56/001* (2013.01)

(58) Field of Classification Search
CPC ......... H04W 36/0058; H04W 36/0061; H04W 56/001

See application file for complete search history.

(56) References Cited

U.S. PATENT DOCUMENTS

2019/0045559 A1* 2/2019 Huang ................ H04W 56/001
2021/0021333 A1* 1/2021 Kusashima ......... H04W 52/242
(Continued)

FOREIGN PATENT DOCUMENTS

| CN | 110212969 A | 9/2019 |
| CN | 110429975 A | 11/2019 |
| CN | 110445528 A | 11/2019 |

OTHER PUBLICATIONS

Ericsson, InterDigital, Thales, Feeder link switch for transparent and regenerative LEO, R2-1905301, 3GPP TSG-RAN WG2 #105bis, , Xian, China, Apr. 8-12, 2019, 8 pages.
(Continued)

*Primary Examiner* — Kent Krueger
(74) *Attorney, Agent, or Firm* — Rimon PC

(57) ABSTRACT

This application provides a gateway handover method and an apparatus, to ensure the reliability of a gateway handover of a terminal device and reduce hardware overheads in a gateway handover process. The terminal device receives a synchronization signal/PBCH (physical broadcast channel) block (SSB) from a network device through a service link. The SSB includes an SSB of a source gateway and an SSB of at least one candidate target gateway. The terminal device obtains a measurement value of channel quality corresponding to the SSB of the at least one candidate target gateway, and sends a measurement result to the network device. The network device forwards the measurement result to the source gateway, which determines, based on the measurement result, whether to hand over the terminal device from the source gateway to one of the at least one candidate target gateway.

20 Claims, 10 Drawing Sheets

(56) References Cited

U.S. PATENT DOCUMENTS

2021/0045051 A1* 2/2021 Kusashima ........... H04W 48/20
2021/0258844 A1* 8/2021 Kim ................... H04W 36/305

OTHER PUBLICATIONS

R3-195481, Qualcomm Incorporated, Discussion about Successful HO in MRO, 3GPP TSG-RAN WG3 Meeting #105bis, Chongqing, China, Oct. 14-18, 2019, 3 pages.
3GPP TR 38.821 V16.0.0 (Feb. 2019), 3rd Generation Partnership Project; Technical Specification Group Radio Access Network; Solutions for NR to support non-terrestrial networks (NTN) (Release 16), 140 pages.
CATT, Huawei, HiSilicon, TP on Feeder Link Switch , 3GPP TSG-RAN WG2 Meeting 108 , R2-1916386, Reno, USA, Nov. 18-22, 2019, 4 pages.
Huawei, HiSilicon, Discussion on SSB measurement in NTN, 3GPP TSG-RAN2 Meeting #108, R2-1915189, Reno, USA, Nov. 18-22, 2019, 5 pages.

* cited by examiner

GATEWAY HANDOVER METHOD AND APPARATUS

CROSS-REFERENCE TO RELATED APPLICATIONS

This application is a continuation of International Patent Application No. PCT/CN2021/074277, filed on Jan. 29, 2021, which claims priority to Chinese Patent Application No. 202010095050.8, filed on Feb. 13, 2020. The disclosures of the aforementioned applications are hereby incorporated by reference in their entireties.

TECHNICAL FIELD

This application relates to the communications field, and in particular, to a gateway handover method and an apparatus.

BACKGROUND

A non-terrestrial network (NTN) communications system refers to a communications network that uses an air platform or a space platform as a relay node or a base station of a transmission device. The air platform or the space platform includes, but not limited to, an uncrewed aerial vehicle, a hot air balloon, an airplane, a satellite, and the like. Satellite communication is used as an example. In a satellite operation, a feeder link needs to be handed over from a source gateway to another gateway due to reasons such as maintenance, traffic offload, dark cloud blocking, rain fade, or the satellite moving out of the visible range of the gateway. Reliability of current hard handover method is poor, and prior art soft handover method requires extra hardware costs and bandwidth.

SUMMARY

This application provides a gateway handover method and an apparatus, to ensure the reliability of a gateway handover and reduce the hardware overheads of a high-altitude platform station.

According to a first aspect, a gateway handover method is provided. The method includes: a terminal device receives a synchronization signal/PBCH (physical broadcast channel) block (SSB) through a service link. The SSB includes a first message and a second message. The first message includes an SSB of a source gateway. The second message includes an SSB of at least one candidate target gateway. The terminal device obtains a measurement result based on the second message. The measurement result includes a measurement value of channel quality corresponding to the SSB of the at least one candidate target gateway. The terminal device sends the measurement result. The terminal device receives a handover instruction. The handover instruction includes gateway handover information determined by the source gateway based on the measurement result. The terminal device determines, based on the handover instruction, whether to be handed over from the source gateway to one of the at least one candidate target gateway.

In the foregoing technical solution, the terminal device receives, on a resource of the same service link, SSBs broadcast by the source gateway and the at least one candidate target gateway. In this way, fewer spectrum resources are occupied. In addition, the source gateway and the at least one candidate target gateway use the same service link, and one service link requires only one transceiver apparatus. This reduces the overheads of hardware resources of a high-altitude platform station.

With reference to the first aspect, in some implementations of the first aspect, the SSB is an SSB in which the first message and the second message are sent in a time division multiplexing or frequency division multiplexing mode through the service link.

With reference to the first aspect, in some implementations of the first aspect, the measurement result further includes a measurement value of channel quality corresponding to the SSB of the source gateway that is obtained by the terminal device based on the first message.

With reference to the first aspect, in some implementations of the first aspect, the second message further includes priority information of a cell. The cell is a corresponding cell for broadcasting the SSB in the second message, and the cell is a cell covered by the service link. The terminal device selects, based on the priority information of the cell, one of the at least one candidate target gateway, to perform a gateway handover.

In the foregoing technical solution, the SSB of the candidate target gateway carries priority information of a corresponding cell, so that UE can determine, based on the priority information of the cell from a plurality of candidate target gateways, a target gateway to which the UE is to be handed over. This reduces the measurement of downlink channel quality of other candidate target gateways by the UE.

With reference to the first aspect, in some implementations of the first aspect, if the terminal device determines to be handed over from the source gateway to the target gateway, before the handover, the method further includes: The terminal device receives synchronization information. The synchronization information is used for time synchronization between the terminal device and the target gateway.

In the foregoing technical solution, the terminal device can quickly and accurately establish time synchronization with the target gateway based on the synchronization information. This improves the reliability of a gateway handover.

With reference to the first aspect, in some implementations of the first aspect, the synchronization information includes a delay difference between the feeder links of the source gateway and the target gateway, and/or a timing difference for sending a signal to a network device by the source gateway and by the target gateway.

With reference to the first aspect, in some implementations of the first aspect, the terminal device receives the synchronization information in a broadcast, multicast, or unicast manner.

With reference to the first aspect, in some implementations of the first aspect, the terminal device receives measurement configuration information. The measurement configuration information includes one or more pieces of the following information: time-frequency information of the SSB of the at least one candidate target gateway, a time domain period of the SSB of the at least one candidate target gateway, and a time-frequency resource for reporting the measurement result.

According to a second aspect, a gateway handover method is provided. The method includes: A network device sends a synchronization signal/PBCH block (SSB) through a service link. The SSB includes a first message and a second message. The first message includes an SSB of a source gateway. The second message includes an SSB of at least one candidate target gateway. The network device receives a measurement result. The measurement result includes a measurement value of channel quality corresponding to the SSB of the at least one candidate target gateway, measured by a terminal device based on the second message. The network device sends the measurement result. The network device receives a handover instruction. The handover instruction includes gateway handover information determined by the source gateway based on the measurement result. The handover instruction is used to indicate whether to hand over the terminal device from the source gateway to one of the at least one candidate target gateway. The network device sends the handover instruction.

With reference to the second aspect, in some implementations of the second aspect, the network device sends the first message and the second message in a time division multiplexing or frequency division multiplexing mode through the service link.

With reference to the second aspect, in some implementations of the second aspect, the measurement result further includes a measurement value of channel quality corresponding to the SSB of the source gateway, that is obtained by the terminal device based on the first message.

With reference to the second aspect, in some implementations of the second aspect, the second message includes priority information of a cell. The cell is a corresponding cell for broadcasting the SSB in the second message, and the cell is a cell covered by the service link.

With reference to the second aspect, in some implementations of the second aspect, the network device sends synchronization information. The synchronization information is used for time synchronization between the terminal device and the target gateway.

With reference to the second aspect, in some implementations of the second aspect, the synchronization information includes a delay difference between feeder links of the source gateway and the target gateway, and/or a timing difference for sending a signal by the source gateway and by the target gateway.

With reference to the second aspect, in some implementations of the second aspect, the network device sends the synchronization information in a broadcast, multicast, or unicast manner.

With reference to the second aspect, in some implementations of the second aspect, the network device sends measurement configuration information. The measurement configuration information includes one or more pieces of the following information: time-frequency information of the SSB of the at least one candidate target gateway, a time domain period of the SSB of the at least one candidate target gateway, and a time-frequency resource for reporting the measurement result.

For technical effects brought by the second aspect or the possible implementations of the second aspect, refer to the descriptions of the technical effects of the first aspect or the implementations of the first aspect. Details are not described again.

According to a third aspect, a gateway handover apparatus is provided. The apparatus has a function of implementing the method according to any one of the first aspect and the possible implementations of the first aspect. A function may be implemented by hardware, or may be implemented by hardware executing corresponding software. The hardware or the software includes one or more units corresponding to the foregoing function.

According to a fourth aspect, a gateway handover apparatus is provided, including a processor. The processor is coupled to a memory, and may be configured to execute instructions in the memory, to implement the method according to any one of the first aspect and the possible implementations of the first aspect. Optionally, the apparatus further includes the memory. Optionally, the apparatus further includes a communications interface. The processor is coupled to the communications interface.

In an implementation, the apparatus is a terminal device. When the apparatus is a terminal device, the communications interface may be a transceiver or an input/output interface. Optionally, the transceiver may be a transceiver circuit. Optionally, the input/output interface may be an input/output circuit.

In another implementation, the apparatus is a chip or a chip system. When the apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the apparatus is a chip or a chip system configured in a terminal device.

According to a fifth aspect, a gateway handover apparatus is provided. The apparatus has a function of implementing the method according to any one of the second aspect and the possible implementations of the second aspect. A function may be implemented by hardware, or may be implemented by hardware executing corresponding software. The hardware or the software includes one or more units corresponding to the foregoing function.

According to a sixth aspect, a gateway handover apparatus is provided, including a processor. The processor is coupled to a memory, and may be configured to execute instructions in the memory, to implement the method according to any one of the second aspect and the possible implementations of the second aspect. Optionally, the apparatus further includes the memory. Optionally, the apparatus further includes a communications interface, and the processor is coupled to the communications interface.

In an implementation, the apparatus is a network device. When the apparatus is a network device, the communications interface may be a transceiver or an input/output interface. Optionally, the transceiver may be a transceiver circuit. Optionally, the input/output interface may be an input/output circuit.

In another implementation, the apparatus is a chip or a chip system. When the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the apparatus is a chip or a chip system configured in a network device.

According to a seventh aspect, a computer program product is provided. The computer program product includes a computer program (which may also be referred to as code or instructions). When the computer program is run, a computer is enabled to perform the method according to any one of the first aspect and the possible implementations of the first aspect.

According to an eighth aspect, a computer program product is provided. The computer program product includes a computer program (which may also be referred to as code or instructions). When the computer program is run, a computer is enabled to perform the method according to any one of the second aspect and the possible implementations of the second aspect.

According to a ninth aspect, a computer-readable storage medium is provided. The computer-readable storage medium stores a computer program (which may also be referred to as code or instructions). When the computer program is run on a computer, the computer is enabled to perform the method according to any one of the first aspect and the possible implementations of the first aspect.

According to a tenth aspect, a computer-readable storage medium is provided. The computer-readable storage medium stores a computer program (which may also be referred to as code or instructions). When the computer program is run on a computer, the computer is enabled to perform the method according to any one of the second aspect and the possible implementations of the second aspect.

According to an eleventh aspect, a communications system is provided. The communications system includes the foregoing network device and terminal device.

DESCRIPTION OF EMBODIMENTS

The following describes technical solutions in this application with reference to the accompanying drawings.

Unless otherwise defined, all technical and scientific terms used in this specification have the same meanings as that usually understood by a person skilled in the art of this application. The terms used in the specification of this application are merely for the purpose of describing specific embodiments, and are not intended to limit this application.

To better understand embodiments of this application, the following first describes a communications system applicable to embodiments of this application and related concepts.

The technical solutions in embodiments of this application may be applied to various communications systems, for example, a long term evolution (LTE) system, a 5th generation (5G) mobile communications system, a device-to-device (D2D) network, a machine-to-machine (M2M) communications system, an NTN communications system, or another future evolved communications system. A 5G radio air interface technology is referred to as new radio (NR), and a 5G system may also be referred to as an NR system. The NTN system may also be referred to as a satellite communications system. In addition, the NTN communications system may further include a high-altitude platform station (HAPS) communications system.

The NTN system refers to a communications network that uses an air platform or a space platform as a transmission device relay node or a base station. The air platform or the space platform includes, but not limited to, an uncrewed aerial vehicle, a hot air balloon, an airplane, a satellite, and the like.

Figure 1:
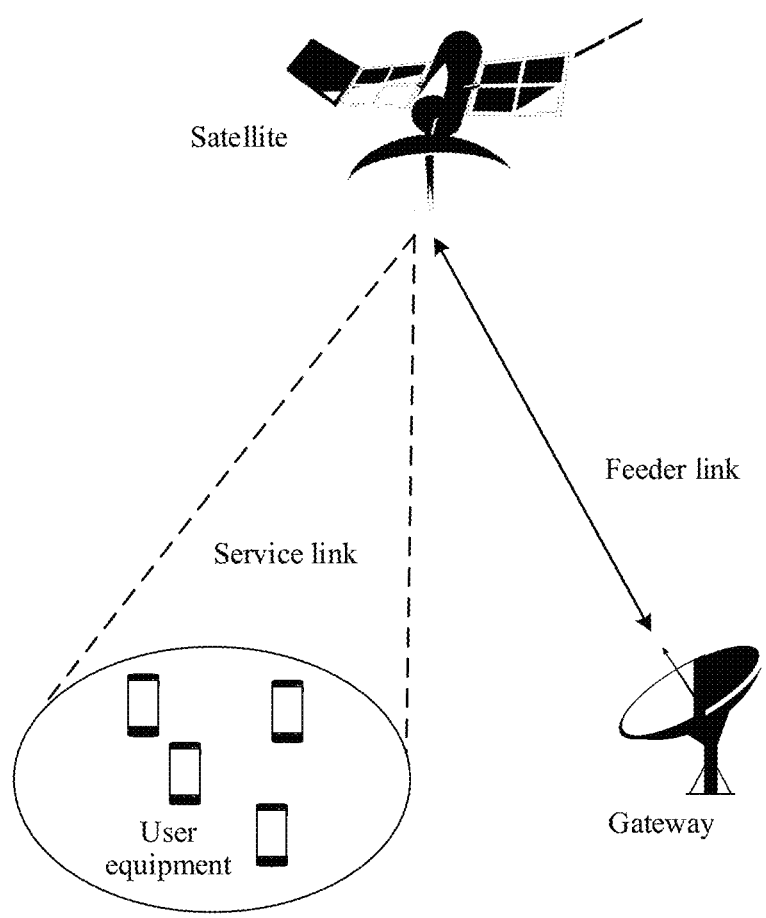
FIG. 1 is a schematic architecture diagram of NTN communication.

FIG. 1 is a schematic architecture diagram of NTN communication. As shown in FIG. 1, satellite communication is used as an example. In this scenario, a gateway (GW), a satellite, user equipment (UE), and the like may be included. A gateway in an NTN system can provide a function similar to that of a gateway in a terrestrial communications system, for example, establishing a connection to UE and communicating with a server. For distinction from the terrestrial communications system. The gateway also has functions such as monitoring and fault query for a satellite, and packet switching and interface protocol conversion for communication data. The gateway is connected to a core network. A link between the gateway and the satellite is referred to as a feeder link. A link between the satellite and user equipment is referred to as a service link. The satellite works in a transparent mode. That is, the satellite functions as a relay to perform radio frequency filtering and amplification and regenerate a signal.

The UE may include various mobile terminals, for example, a mobile satellite phone, or may include various fixed terminals, for example, a terrestrial communications station.

The terminal may be a wireless terminal or a wired terminal. The wireless terminal may be a device that provides a user with voice and/or data connectivity, a handheld device having a wireless connection function, or another processing device connected to a wireless modem. The wireless terminal may communicate with one or more core networks through a radio access network (RAN). The wireless terminal may be a mobile terminal, for example, a mobile phone (or also referred to as a "cellular" phone), and a computer having a mobile terminal. For example, the wireless terminal may be a portable, pocket-sized, handheld, computer-built-in or vehicle-mounted mobile apparatus, which exchanges languages and/or data with the radio access network. For example, the wireless terminal may be a device such as a personal communications service (PCS) phone, a cordless telephone, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile, a remote station (RS), an access point (AP), a remote terminal (RT), an access terminal (AT), user equipment (UE), a user agent (UA), a terminal device (TD). A terminal device represented by a satellite phone or a vehicle-mounted satellite system may directly communicate with a satellite. A fixed terminal represented by a terrestrial communications station can communicate with a satellite only after being relayed by a terrestrial station. The terminal device sets and obtains a communication status by installing a wireless transceiver antenna, to complete communication.

It should be understood that FIG. 1 describes an example of an NTN communication scenario. An example in which a network device is a satellite is used. However, the network device in embodiments of this application is not limited thereto. The network device in this application may alternatively be a gateway, a high-altitude platform station, or an uncrewed aerial vehicle in NTN communication, or a terminal device that functions as a base station in D2D communication, or the like.

In the scenario shown in FIG. 1, in a satellite operation, a feeder link needs to be handed over from a source gateway to another gateway due to a reason such as maintenance, traffic offload, dark cloud blocking, rain fade, or that the satellite moves out of a visible range of the gateway.

Figure 2:
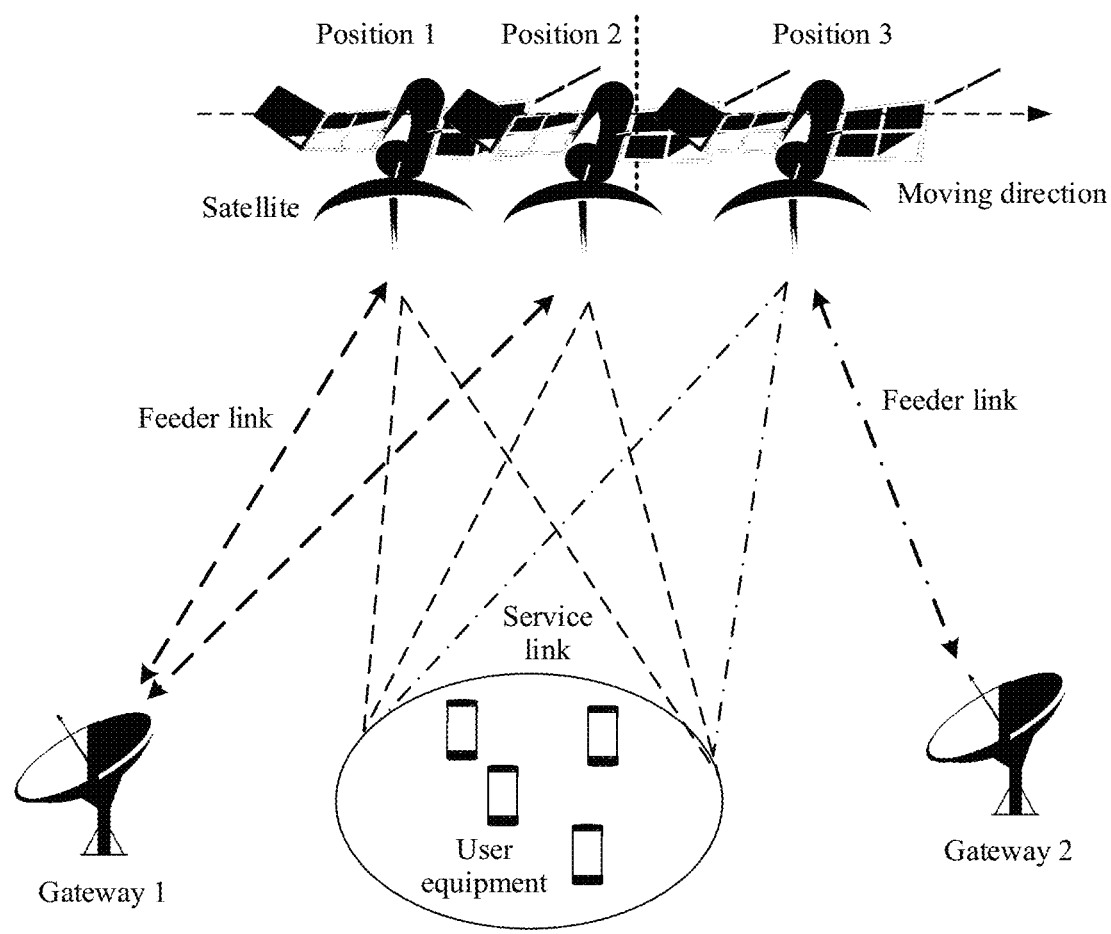
FIG. 2 is a schematic diagram of a hard handover of a gateway.

FIG. 2 is a schematic diagram of a hard handover of a gateway. A satellite works in a transparent mode. For a coverage area (a beam or a cell, where one or more beams form one cell) of a service link in FIG. 2, it is assumed that each of a feeder link and the service link of the satellite has only one transceiver device to support communication between the gateway and user equipment. Only one gateway can serve a beam or cell at a time. When the satellite moves to a position indicated by a black dashed line in FIG. 2, the satellite is handed over from a gateway 1 to a gateway 2. That is, the feeder link is handed over from the gateway 1 to the gateway 2. Because the hard handover requires strict time-frequency synchronization, if a timing and a frequency of a downlink signal sent by the gateway 2 change greatly, the user equipment loses time-frequency synchronization with the gateway 2. The user equipment needs to re-access a network and establish a radio resource control (RRC) connection, resulting in a large interrupt latency. A disadvantage of the hard handover is that its reliability is poor. When communication of the UE is interrupted, an RRC connection needs to be re-established, and an interrupt latency is large.

Figure 3:
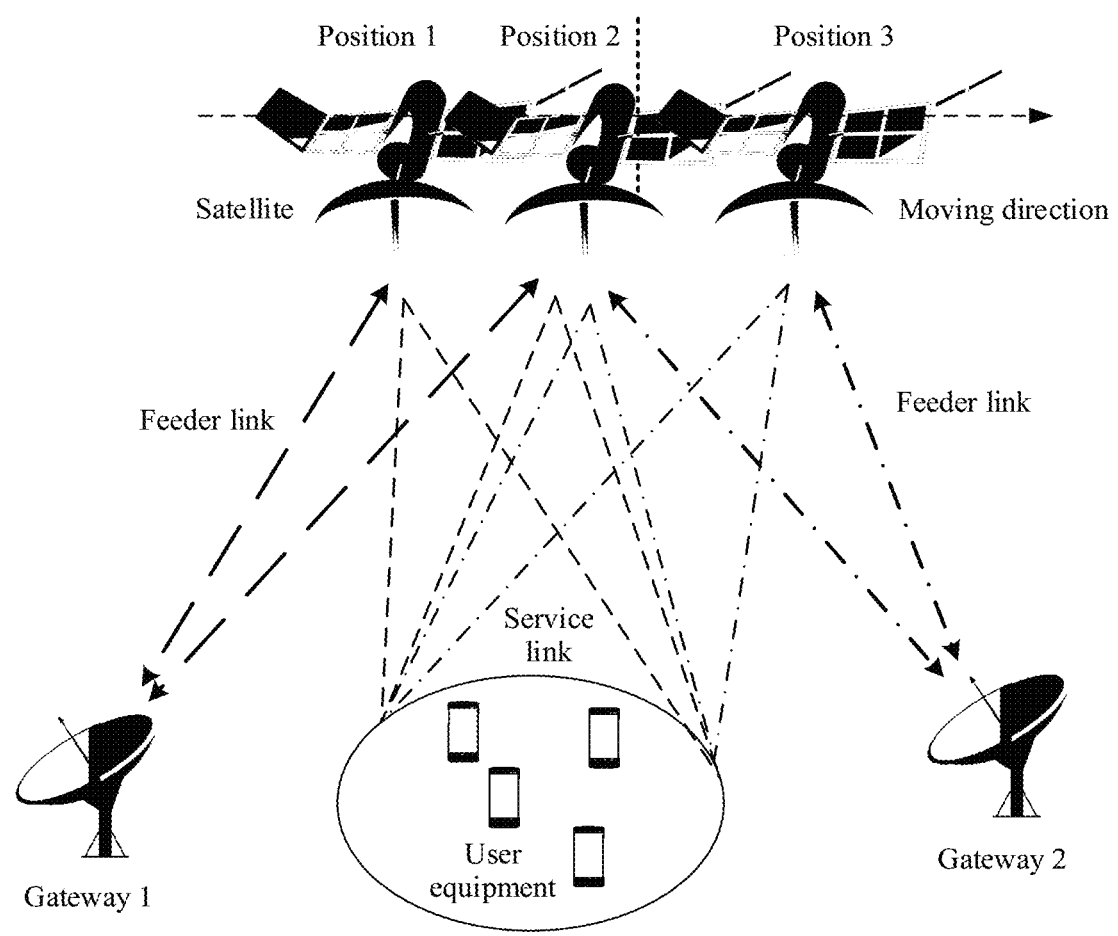
FIG. 3 is a schematic diagram of a soft handover of a gateway.

FIG. 3 is a schematic diagram of a soft handover of a gateway. When a satellite is near a dashed line, the satellite establishes both a feeder link connection to a gateway 1 and a feeder link connection to a gateway 2 simultaneously. At the same time, the two gateways have different service links to provide communications services for user equipment in the same area. The user equipment shown in FIG. 3 establishes a connection to the gateway 2 while maintaining a communications connection to the gateway 1. After successfully establishing the connection to the gateway 2, the user equipment disconnects the connection to the gateway 1. In a soft handover method, a new connection is first established, and then an old connection is disconnected. This can ensure the reliability of a handover of the user equipment to a gateway. However, to establish the new connection in the soft handover, transceiver devices of a feeder link and a service link need to be additionally added. This increases hardware costs of a satellite platform. In addition, to ensure that the gateway 1 and the gateway 2 can simultaneously provide communications services for user equipment in the same coverage area, the service links of the two gateways need to work in different frequency bands. Therefore, the service link of the gateway 2 further needs to occupy an additional bandwidth.

In view of this, this application provides a method to optimize a gateway handover mechanism in a satellite communications scenario, so as to effectively improve a handover success rate, and save spectrum resources and hardware resources of a service link.

Figure 4:
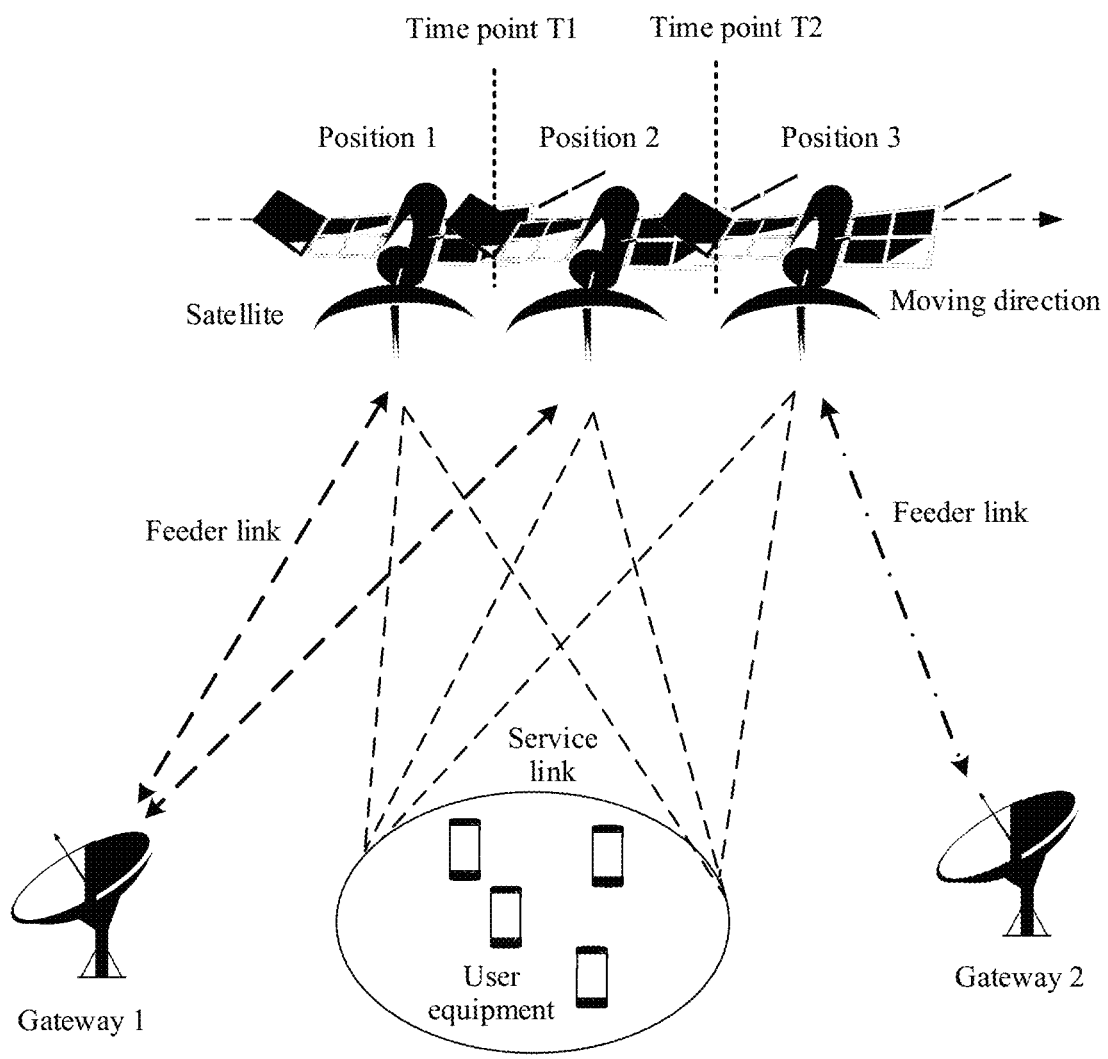
FIG. 4 is a schematic architecture diagram of NTN communication applicable to an embodiment of this application.

FIG. 4 is a schematic architecture diagram of NTN communication applicable to an embodiment of this application. When a satellite is at a position between a time point T1 and a time point T2, user equipment (that is, an example of a terminal device) in a coverage area of the satellite (that is, an example of a network device) needs to be handed over from a gateway 1 (that is, an example of a source gateway) to a gateway 2 (that is, an example of a target gateway). The gateway 1 and the gateway 2 cover the same beam or cell by using the same frequency domain resource on a service link within a period of time, to provide a handover time window for the user equipment in the coverage area.

Figure 5:
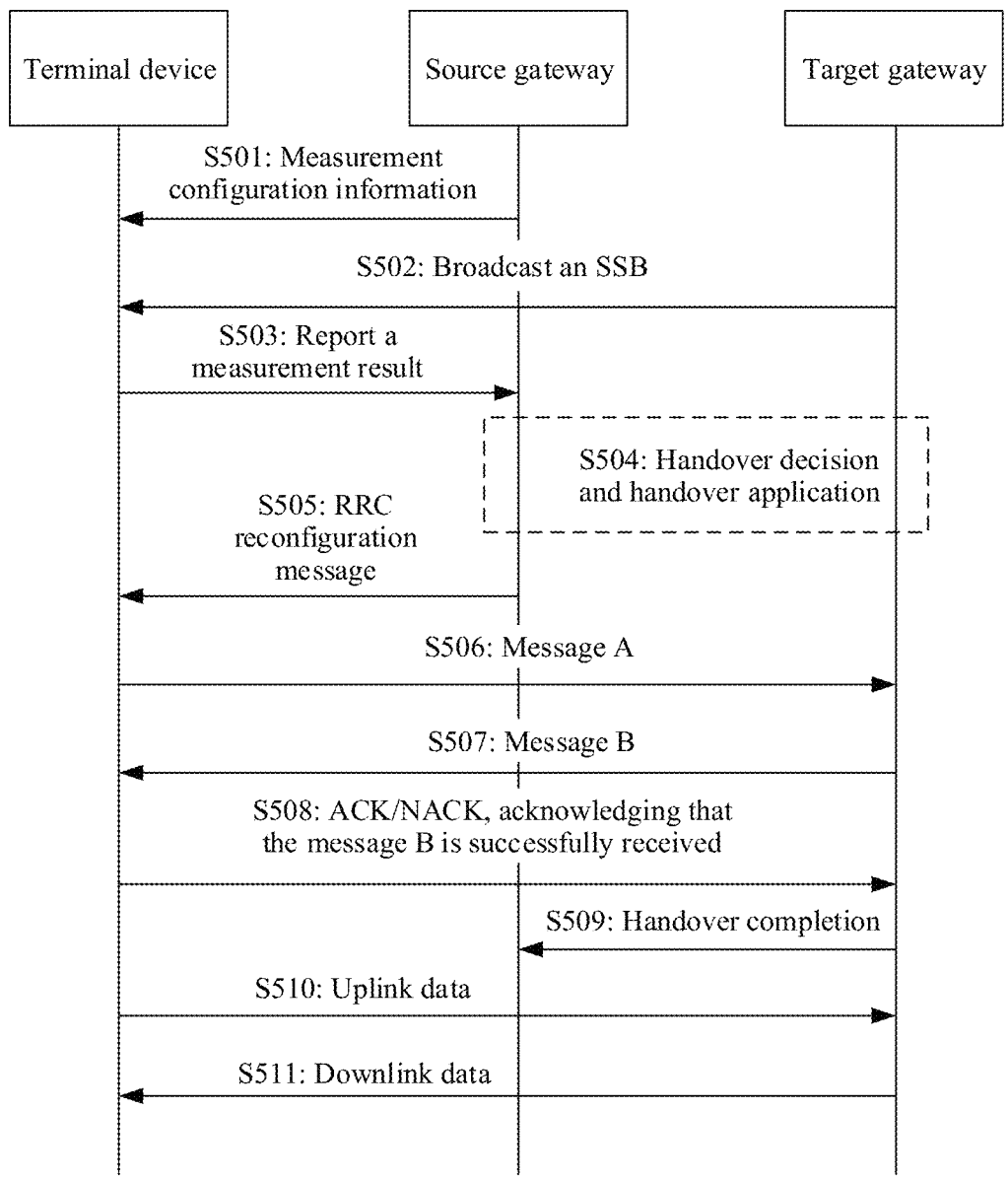
FIG. 5 is a schematic interaction diagram of a gateway handover method applicable to an embodiment of this application.

For completeness of the solution, the following describes related steps of gateway handover with reference to FIG. 5. FIG. 5 is a schematic interaction diagram of a gateway handover method applicable to an embodiment of this application.

S501: A gateway 1 sends measurement configuration information to UE.

The measurement configuration information includes time-frequency information of a synchronization signal/PBCH block (SSB) broadcast by a gateway 2, a time domain period of the SSB of the gateway 2, an uplink resource for reporting a measurement result by the UE, and the like. The SSB includes a primary synchronization signal (PSS), a secondary synchronization signal (SSS), a physical broadcast channel (PBCH), and the like. The SSB provides downlink synchronization and basic configuration information of a cell for the UE. The PBCH carries a master information block (MIB) of the cell. The MIB indicates whether a system information block type 1 (SIB 1) exists and indicates a position of the SIB 1.

It should be understood that, in some embodiments of this application, communication and configuration between the gateway 1 and the UE and between the gateway 2 and the UE need to be forwarded by using a satellite as a relay device.

S502: The gateway 2 broadcasts the SSB on a corresponding time-frequency resource.

Correspondingly, the satellite serves as a relay station, and after receiving SSBs broadcast by the two gateways, broadcasts the SSB of the gateway 2 and the SSB of the gateway 1 to the UE in a time division multiplexing or frequency division multiplexing mode through a service link.

A specific pattern of broadcasting the SSB of the gateway 1 and the SSB of the gateway 2 in a time division multiplexing or frequency division multiplexing mode in S502 is not described in detail herein. Detailed description is provided below with reference to FIG. 7 to FIG. 9.

S503: The UE measures corresponding channel quality based on the SSB broadcast by the gateway 2, and reports the channel quality to the gateway 1 through the satellite.

Optionally, a measurement result of the channel quality may include one or more of the following parameters: a reference signal to noise power ratio (SNR), a bit energy to noise power spectrum density ratio (Eb/No), a reference signal received power (RSRP), a channel quality indicator (CQI), a signal to interference plus noise power ratio (SINR), a reference signal received quality (RSRQ), or decoding performance (such as a packet loss rate).

S504: The gateway 1 determines, based on the channel quality reported by the UE, whether to hand over the UE to the gateway 2.

The gateway 1 sends a handover instruction to the satellite based on the channel quality reported by the UE. The handover instruction includes gateway handover information determined by a source gateway based on the measurement result. The handover instruction is used to indicate whether to hand over the UE from the source gateway to a target gateway. The satellite sends the handover instruction to the UE. If it is determined that the UE is to be handed over to the gateway 2, the gateway 1 applies to the gateway 2 for handover access.

Optionally, when there is only one candidate target gateway, the source gateway may directly hand over the UE to the target gateway without based on measured quality of a channel between a candidate target gateway and the UE.

Optionally, due to reasons such as weather impact, quality of a link between the source gateway and the UE, and the like, when a gateway handover needs to be considered, the UE obtains corresponding channel quality of the gateway 1 and channel quality of the gateway 2 through measurement based on the SSBs broadcast by the gateway 1 and the gateway 2. The UE reports the measurement result to the gateway 1 through the satellite. The source gateway (that is, the gateway 1) may determine, based on the measured channel quality, whether to hand over the UE to the target gateway (the gateway 2). For example, if the channel quality of the target gateway is better than that of the source gateway, the handover is performed; if the channel quality of the target gateway is not better than that of the source gateway, the handover is not performed.

S505: The gateway 1 sends an RRC reconfiguration message to the UE. The reconfiguration message includes information required for handing over the UE to the gateway 2, a target cell identifier (ID), a new cell radio network temporary identifier (C-RNTI) (used in a target cell), a security algorithm of the target cell, and a time-frequency resource for sending information A, and the like.

It should be understood that the target cell herein is a corresponding cell for broadcasting the SSB of the gateway 2.

S506: The UE sends the information A to the gateway 2 on a scheduled time-frequency resource by using a new C-RNTI. The information A includes applying for establishing an RRC connection in the target cell.

S507: The gateway 2 sends message B to the UE. The message B includes confirming establishment of the RRC connection.

S508: The UE sends a hybrid automatic repeat request (HARQ) acknowledgment/negative acknowledgment (ACK/NACK) to the gateway 2, to acknowledge that the message B is successfully received.

S509: The gateway 2 sends a handover complete message to the gateway 1, to acknowledge that the UE has been handed over to the gateway 2.

S510: The UE sends data to the gateway 2. The gateway 2 may schedule a time-frequency resource that is used by the UE to send uplink data to the gateway 1.

S511: The gateway 2 sends data to the UE. The gateway 2 may use a time-frequency resource that is used by the gateway 1 to send downlink data to the UE.

After all UEs in a beam or cell served by the gateway 1 are handed over to the gateway 2, a service of the gateway 1 for the coverage beam or cell may be disabled.

It should be understood that, in a protocol, different beams or cells may be distinguished based on a bandwidth part (BWP), a transmission configuration indicator (TCI), or an SSB. In other words, a beam may be indicated based on a BWP, a TCI, or an SSB. For example, a beam handover between a terminal device and a network device may be indicated by a BWP, TCI, or SSB handover. Therefore, for the terminal device and/or the network device, the BWP, TCI, or SSB handover may be actually performed. In addition, the beam in this application may be replaced with a BWP, a TCI, or an SSB.

In the foregoing technical solution, in comparison with a soft handover method, fewer frequency domain resources are occupied, and the service link needs only one transceiver apparatus. This reduces overheads of hardware resources. In comparison with a hard handover manner, reliability of the handover is improved.

Figure 6:
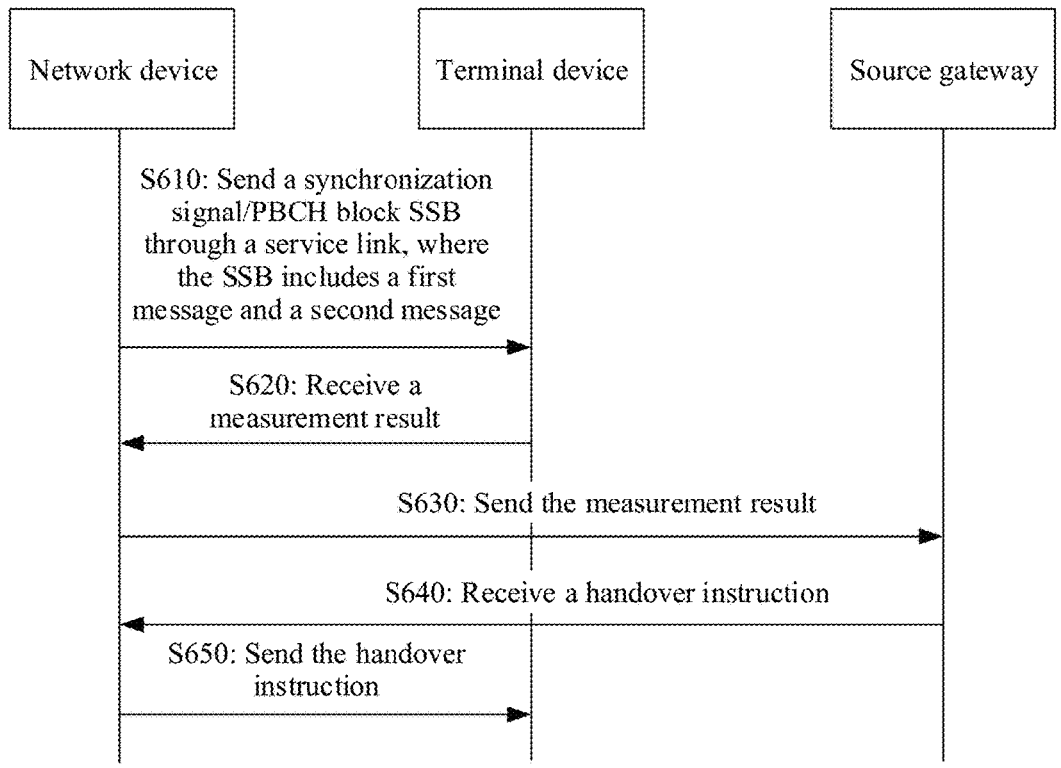
FIG. 6 is a schematic interaction diagram of a gateway handover method applicable to an embodiment of this application.

It should be understood that FIG. 4 schematically shows a handover scenario in which there is only one candidate target gateway (the gateway 2) in a satellite movement process. In an actual gateway handover process, there may be at least one candidate target gateway. For example, in the handover scenario shown in FIG. 4, when the satellite is between the time points T1 and T2, the satellite is simultaneously connected to the gateway 1, the gateway 2, a gateway 3, and a gateway 4. The gateway 1 is the source gateway. The gateway 2, the gateway 3, and the gateway 4 are candidate target gateways. In corresponding S502, the source gateway and the three candidate target gateways separately broadcast SSBs to the satellite on corresponding time-frequency resources, and the satellite sends the received four SSBs to the UE in a time division multiplexing or frequency division multiplexing mode. FIG. 6 is a schematic interaction diagram of a gateway handover method applicable to an embodiment of this application. With reference to FIG. 6, the following describes how to implement a gateway handover when there are a plurality of (that is, two or more) candidate target gateways.

S610: A network device sends a synchronization signal/PBCH block (SSB) to a terminal device through a service link, where the SSB includes a first message and a second message.

Correspondingly, the terminal device receives the SSB from the network device through the service link.

Optionally, the network device may be a satellite.

The first message includes an SSB of a source gateway. The second message includes SSBs of a plurality of candidate target gateways.

Optionally, the first message may further include a system information block (SIB) 1 and other system information (OSI) that are broadcast by the source gateway. The second message may further include SIBs 1 and OSI of the plurality of candidate target gateways. The information may provide UE with more information (for example, satellite orbit information, a satellite moving speed, and a gateway position) related to the network device and the gateway, so that the UE can establish time-frequency synchronization with the target gateway more quickly.

S620: The network device receives a measurement result from the terminal device.

Correspondingly, the terminal device sends the measurement result to the network device.

The measurement result includes a measurement value of channel quality corresponding to each of the SSBs of the plurality of candidate target gateways that is obtained by the terminal device based on the second message.

Optionally, the measurement result may further include a measurement value of channel quality corresponding to the SSB of the source gateway that is obtained by the terminal device based on the first message.

S630: The network device sends the measurement result to the source gateway.

S640: The network device receives a handover instruction from the source gateway.

The handover instruction includes gateway handover information determined by the source gateway based on the measurement result. The handover instruction is used to indicate whether to hand over the terminal device from the source gateway to one of the plurality of candidate target gateways. For example, a gateway 1 is the source gateway. Gateways 2, 3, and 4 are the plurality of candidate target gateways. The UE separately measures corresponding channel quality based on SSBs broadcast by the gateways 2, 3, and 4, and forwards a measurement result to the gateway 1 through the satellite. It is assumed that a measurement value of the gateway 3 is optimal, the handover instruction may indicate to hand over the terminal device from the gateway 1 to the gateway 3.

Optionally, the measurement result of the channel quality may include one or more of the following parameters: a reference SNR, an Eb/No, an RSRP, a CQI, an SINR, an RSRQ, or decoding performance (such as a packet loss rate).

S650: The network device sends the handover instruction to the terminal device.

Correspondingly, the terminal device receives the handover instruction, and performs a gateway handover based on information indicated in the handover instruction.

It should be understood that S610 to S650 are core steps improved in the gateway handover method in this application. For other steps, refer to descriptions of the embodiment corresponding to FIG. 5. Details are not described herein again.

In the foregoing technical solution, in comparison with a soft handover method, fewer frequency domain resources are occupied, and the service link needs only one transceiver apparatus. This reduces overheads of hardware resources. In comparison with a hard handover manner, reliability of the handover is improved.

Figure 7:
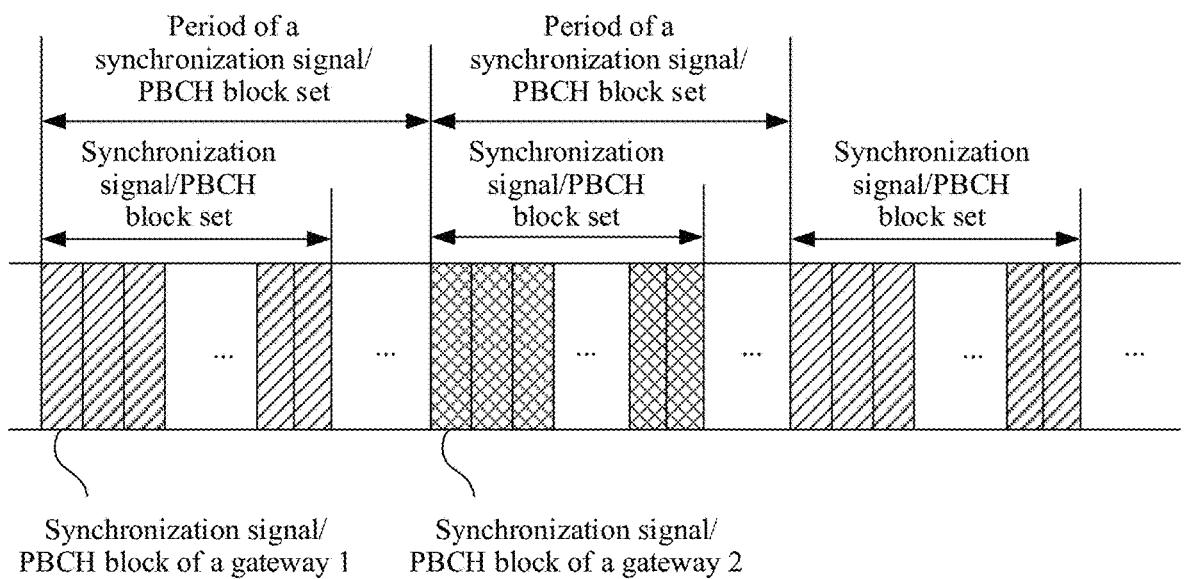
FIG. 7 is a schematic diagram 1 of a pattern of broadcasting synchronization signal/PBCH blocks of a source gateway and a target gateway on a time domain resource of a service link.
Figure 8:
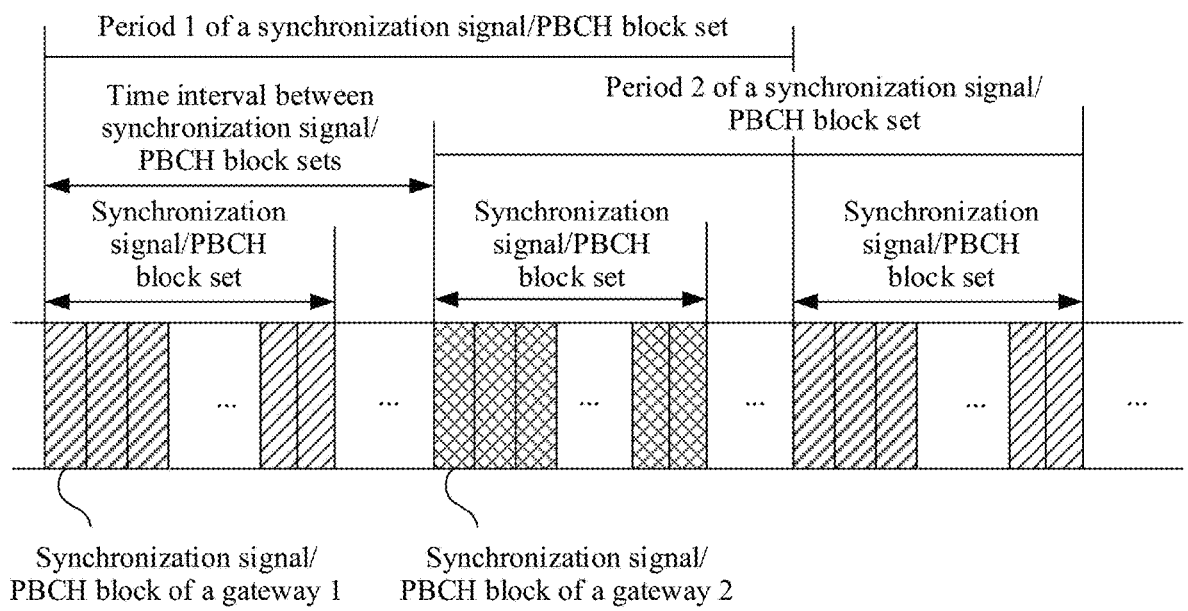
FIG. 8 is a schematic diagram 2 of a pattern of broadcasting synchronization signal/PBCH blocks of a source gateway and a target gateway on a time domain resource of a service link.

FIG. 7 and FIG. 8 are respectively a schematic diagram 1 and a schematic diagram 2 of patterns of broadcasting synchronization signal/PBCH blocks of a source gateway and a target gateway on a time domain resource of a service link.

In FIG. 7 and FIG. 8, an SSB filled with slashes represents an SSB broadcast by a gateway 1 (that is, an example of a source gateway). An SSB filled with grid lines represents an SSB broadcast by a gateway 2 (that is, an example of a target gateway). The SSBs broadcast by the two gateways are separated in time domain (that is, the SSB of the source gateway and the SSB of the target gateway are sent in a time division multiplexing mode).

It should be understood that because the SSB of the gateway 1 and the SSB of the gateway 2 are sent in the time division multiplexing mode, the gateway 1 and the gateway 2 need to separately reserve a resource for each other on a time domain resource when broadcasting the SSBs.

A plurality of SSBs form a synchronization signal/PBCH block set. A time domain period of the synchronization signal/PBCH block set may be 5 ms, 10 ms, 20 ms, 40 ms, 80 ms, or 160 ms, and is usually 20 ms by default.

Optionally, the RRC reconfiguration message in S505 may carry a time-frequency resource on which the SSB of the gateway 2 is located, and a period of the SSB or a period of the SSB set of the gateway 2. The UE detects the SSB of the gateway 2 based on the information.

FIG. 7 shows a case in which a time interval between an SSB set of the gateway 1 and the SSB set of the gateway 2 is equal to the period of the synchronization signal/PBCH block set (a period of the SSB set of the gateway 1 is the same as the period of the SSB set of the gateway 2).

FIG. 8 shows a case in which the time interval between the SSB set of the gateway 1 and the SSB set of the gateway 2 is set to another value. It is assumed that a period 1 of the SSB set of the gateway 1 is the same as a period 2 of the SSB set of the gateway 2. A time interval between SSB sets of different gateways may be set to different values based on a system requirement, provided that the UE is notified to perform detection based on the time interval.

It should be understood that the patterns of the SSBs in FIG. 7 and FIG. 8 are schematic diagrams of a case in which there is only one candidate target gateway. Likewise, when there are a plurality of candidate target gateways, the pattern of the SSB includes SSBs of the plurality of candidate target gateways. When broadcasting an SSB, each of the plurality of candidate target gateways needs to reserve, on a corresponding time domain resource, a resource for an SSB broadcast by another candidate target gateway.

In the technical solutions shown in FIG. 7 and FIG. 8, the SSBs of the gateway 1 and the gateway 2 are broadcast by using the resource of the same service link. In this way, the service link of the two gateways may use the same frequency resource, and fewer spectrum resources are occupied. Correspondingly, the UE may detect, on a frequency domain resource of the same service link based on the time interval between the SSB set of the gateway 1 and the SSB set of the gateway 2, the SSBs broadcast by the two gateways, and the service link requires only one transceiver apparatus. This reduces the overheads of hardware resources.

Figure 9:
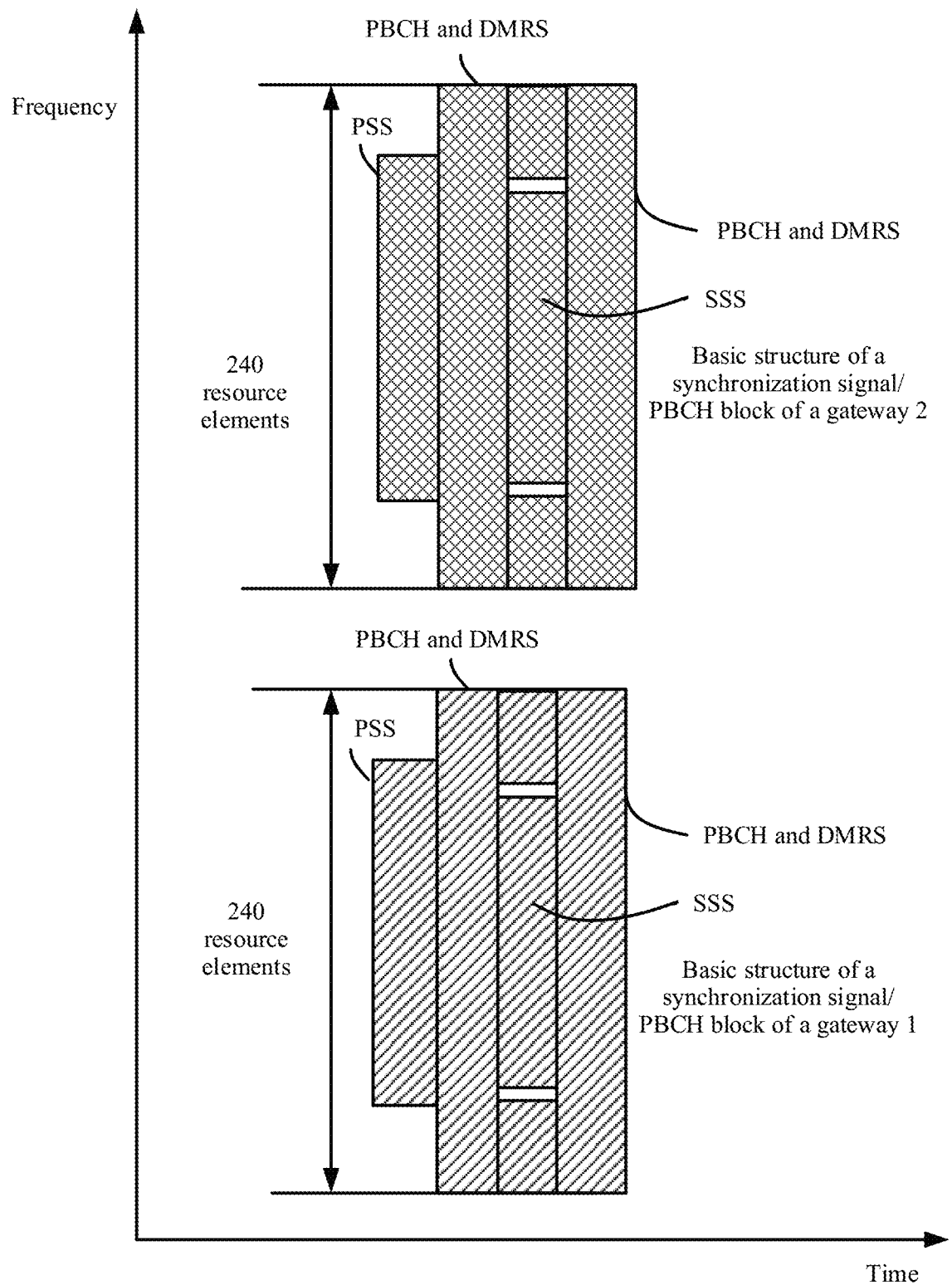
FIG. 9 is a schematic diagram of a pattern of broadcasting synchronization signal/PBCH blocks of a source gateway and a target gateway on a frequency domain resource of a service link.

FIG. 9 is a schematic diagram of a pattern of broadcasting synchronization signal/PBCH blocks of a source gateway and a target gateway on a frequency domain resource of a service link.

In FIG. 9, an SSB filled with slashes represents an SSB broadcast by a gateway 1. An SSB filled with grid lines represents an SSB broadcast by a gateway 2. A difference from FIG. 7 and FIG. 8 lies in that, the SSBs broadcast by the two gateways shown in FIG. 9 are separated in frequency domain (that is, different SSBs are sent in a frequency division multiplexing mode).

Optionally, the RRC reconfiguration message in S505 may carry a time-frequency resource on which the SSB of the gateway 2 is located, and a period of the SSB or a period of the SSB set of the gateway 2. The UE detects the SSB of the gateway 2 based on the information.

It should be understood that the pattern of the SSB in FIG. 9 is a schematic diagram of a case in which there is only one candidate target gateway. Likewise, when there are a plurality of candidate target gateways, the pattern of the SSB includes SSBs of the plurality of candidate target gateways. When broadcasting an SSB, each of the plurality of candidate target gateways needs to reserve, on a corresponding frequency domain resource, a resource for an SSB broadcast by another candidate target gateway.

In the technical solution shown in FIG. 9, the SSBs of the gateway 1 and the gateway 2 are broadcast by using the resource of the same service link. In this way, the service link of the two gateways may use the same frequency resource, and fewer spectrum resources are occupied. Correspondingly, the UE may detect, on a frequency domain resource of the same service link, based on the frequency domain resource in which the SSB of the gateway 1 and the SSB of the gateway 2 are located, the SSBs broadcast by the two gateways, and the service link requires only one transceiver apparatus. This reduces the overheads of hardware resources.

It can be learned from the embodiment shown in FIG. 6 that, when there are a plurality of candidate target gateways, the UE needs to measure an SSB sent by each candidate target gateway. The source gateway finally determines, based on measurement results of all the SSBs, a candidate target gateway to which the UE is to be handed over. In this way, measurement tasks and signaling overheads of the UE are increased. In view of this, this application provides a method, to reduce measurement tasks of the UE, and improve handover efficiency and a handover success rate.

Optionally, when there are two or more candidate target gateways, the second message may carry priority information and/or feeder link quality of corresponding cells of SSBs of the plurality of candidate target gateways, so as to provide reference for the UE that needs to be handed over to select a cell. The corresponding cell is a cell for broadcasting the SSB of the candidate target gateway, and the cell is in a one-to-one correspondence with the SSB of the candidate target gateway. The UE may determine, based on the priority information and/or the feeder link quality, a candidate target gateway that is to be accessed. In addition, the UE may report only a measurement value of channel quality corresponding to the gateway to the source gateway, so as to notify the source gateway of selection of the target gateway. After the target gateway for handover is determined, for subsequent handover steps, refer to S503 and subsequent steps in FIG. 5. Details are not described herein again.

Optionally, the first message may alternatively carry priority information of a corresponding cell of the SSB of the source gateway, and a newly accessed UE may select a to-be-accessed cell based on the priority information of the corresponding cell of the SSB of the source gateway and the priority information of the corresponding cell of the SSB of the candidate target gateway. For example, the newly accessed UE selects a beam or a cell with a high access priority.

Optionally, a priority is indicated by using a reserved 1-bit parameter Spare in a PBCH. For example, 1 indicates a high priority, and 0 indicates a low priority; or 0 indicates a high priority, and 1 indicates a low priority.

Optionally, the priority is implicitly indicated by using a cell identifier 1, a cell identifier 2, or a physical cell identifier that is obtained based on a PSS and/or an SSS. For example, a larger cell identifier number indicates a higher priority, and a smaller cell identifier number indicates a lower priority. Alternatively, the cell identifier 2 implicitly indicates a priority. For example, a larger cell identifier 2 indicates a higher priority, and a smaller cell identifier 2 indicates a lower priority. Alternatively, the cell identifier 1 implicitly indicates a priority. For example, a larger cell identifier 1 indicates a higher priority, and a smaller cell identifier 1 indicates a lower priority.

The cell identifier 2 is obtained based on the PSS: $N_{ID}^{(2)}=\{0, 1, 2\}$.

The cell identifier 1 is obtained based on the SSS: $N_{ID}^{(1)}=\{0, 1, \ldots, 355\}$.

The physical cell identifier is: $N_{ID}=3 \times N_{ID}^{(1)}+N_{ID}^{(2)}$.

Optionally, the priority is implicitly indicated by using a position of a system frame number (SFN), a subframe number, a slot number, or an orthogonal frequency division multiplexing (OFDM) symbol in which the SSB is located. For example, a parity or a fixed number of single digits of the system frame number. For another example, a larger slot number in which the SSB is located indicates a higher priority.

Optionally, priority information of a cell is carried in remaining minimum system information (RMSI) or OSI. For example, the SIB 1 carries priority information of the SSB or the cell.

In the foregoing technical solution, the SSB of the candidate target gateway carries the priority information of the corresponding cell, so that the UE can determine, based on the priority information of the cell from the plurality of candidate target gateways, a target gateway to which the UE is to be handed over. This reduces the measurement of downlink channel quality of other candidate target gateways by the UE.

To enable the UE to quickly and accurately establish uplink and downlink time synchronization with the target gateway, the satellite needs to send synchronization information to the UE. It should be understood that the synchronization information is actually sent by the source gateway to the satellite, and forwarded by the satellite to the UE.

The source gateway may calculate, based on a position of the satellite and positions of the two gateways, the synchronization information required for the gateway handover. The synchronization information includes a propagation delay difference between two feeder links and/or a timing difference for sending downlink signals by the two gateways. The source gateway notifies the UE of the synchronization information through the satellite.

Optionally, the synchronization information may be sent to the UE in a broadcast, multicast, or unicast manner.

For example, in FIG. 4, if a propagation delay between the satellite and the gateway 1 is a delay 1, and a propagation delay between the satellite and the gateway 2 is a delay 2, a propagation delay difference between the feeder links of the two gateways is delay_diff=delay 2−delay 1. Alternatively, a propagation round-trip delay difference, that is, delay_RTDdiff=2×(delay 2−delay 1), is calculated based on a propagation round-trip delay (RTD).

Figure 10:
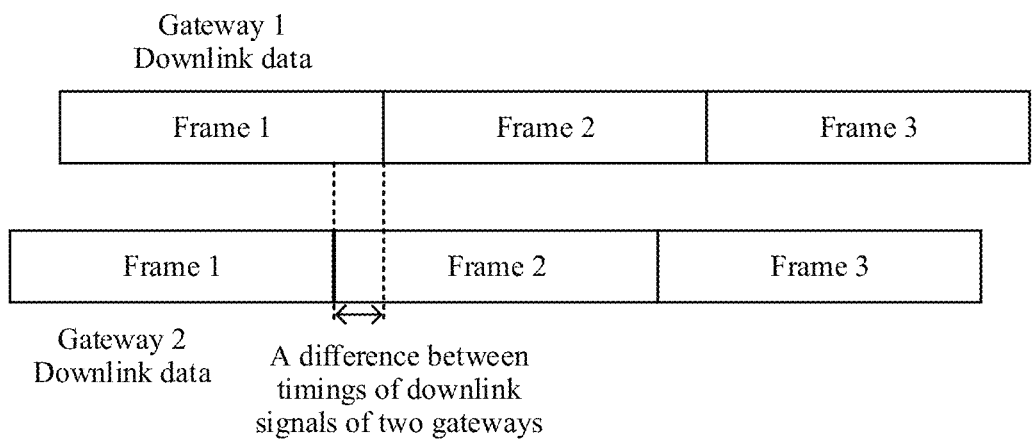
FIG. 10 is a schematic diagram of a timing difference for sending a downlink signal by a source gateway and by a target gateway.

In addition, considering that a timing for sending a downlink signal by the gateway 1 and a timing for sending a downlink signal by the gateway 2 are not necessarily aligned, as shown in FIG. 10, the source gateway also needs to notify, through the satellite, the UE of a timing difference DL_timing_diff for sending downlink signals by the two gateways over a downlink (DL). The UE derives, based on the timing difference for sending the downlink signals and the propagation delay difference between the feeder links, a timing at which the UE receives the downlink signal of the target gateway. For example, the UE may add or subtract delay_diff and DL_timing_diff based on a timing at which the downlink signal of the source gateway is received, to obtain the timing for receiving the downlink signal of the target gateway.

The UE can derive, based on the propagation delay difference delay_diff and a timing advance (TA) value that is used to send an uplink signal to the source gateway, a TA value used at the target gateway. For example, 2×delay_diff may be added to or subtracted from the original TA value.

The solution in embodiments of this application is also applicable to a handover between satellites, which is equivalent to that both a service link and a feeder link change. To enable the UE to quickly and accurately establish uplink and downlink time synchronization with the target gateway/the satellite. Similarly, synchronization information, for example, a delay difference between the service links, and a delay difference between the feeder links, and a timing difference between the downlink signals of the two gateways, may be sent to the UE.

Optionally, for a network device, the synchronization information may be carried in at least one type of broadcast information such as a SIB 1, an OSI, and an MIB.

Optionally, for a network device, if the synchronization information is sent in an RRC connection phase, the synchronization information may be carried in at least one of RRC information, RRC reconfiguration information, downlink control information (DCI), group DCI, a medium access control (MAC) element, and a timing advance command (TAC). Alternatively, the synchronization information is transmitted along with data or is sent to a terminal device on a separately allocated physical downlink shared channel (PDSCH) bearer.

Embodiments described in this application may be independent solutions, or may be combined based on internal logic. All these solutions fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

The following describes a gateway handover apparatus provided in this application.

Figure 11:
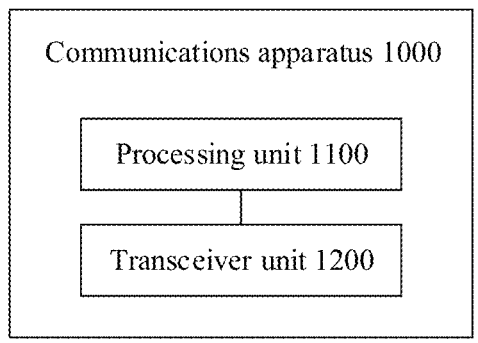
FIG. 11 is a schematic diagram of a structure of a communications apparatus 1000 according to this application.

FIG. 11 is a schematic block diagram of a communications apparatus 1000 according to this application. As shown in FIG. 11, the communications apparatus 1000 includes a processing unit 1100 and a transceiver unit 1200.

The transceiver unit 1200 is configured to receive a synchronization signal/PBCH block (SSB) through a service link. The SSB includes a first message and a second message. The first message includes an SSB of a source gateway. The second message includes an SSB of at least one candidate target gateway. The processing unit 1100 is configured to obtain a measurement result based on the second message. The measurement result includes a measurement value of channel quality corresponding to the SSB of the at least one candidate target gateway. The transceiver unit 1200 is further configured to send the measurement result. The transceiver unit 1200 is configured to receive a handover instruction. The handover instruction includes gateway handover information determined by the source gateway based on the measurement result. The processing unit 1100 is further configured to determine, based on the handover instruction, whether to hand over a terminal device configured with the apparatus from the source gateway to one of the at least one candidate target gateway.

Optionally, the SSB is an SSB in which the first message and the second message are sent in a time division multiplexing or frequency division multiplexing mode through the service link.

Optionally, the measurement result further includes a measurement value of channel quality corresponding to the SSB of the source gateway that is obtained by the terminal device based on the first message.

Optionally, the second message further includes priority information of a cell. The cell is a corresponding cell for broadcasting the SSB in the second message, and the cell is a cell covered by the service link. The terminal device selects, based on the priority information of the cell, one of the at least one candidate target gateway, to perform a gateway handover.

Optionally, before the terminal device configured with the apparatus is handed over from the source gateway to the target gateway, the transceiver unit 1200 is further configured to receive synchronization information. The synchronization information is used for time synchronization between the terminal device configured with the apparatus and the target gateway.

Optionally, the synchronization information includes a delay difference between feeder links of the source gateway and the target gateway, and/or a difference between a timing difference for sending a signal to the network device by the source gateway and by the target gateway.

Optionally, the transceiver unit 1200 is further configured to receive the synchronization information in a broadcast, multicast, or unicast manner.

Optionally, the transceiver unit 1200 is further configured to receive measurement configuration information. The measurement configuration information includes one or more pieces of the following information: time-frequency information of the SSB of the at least one candidate target gateway, a time domain period of the SSB of the at least one candidate target gateway, and a time-frequency resource for reporting the measurement result.

Optionally, the transceiver unit 1200 may alternatively be replaced with a sending unit or a receiving unit. For example, when performing a sending action, the transceiver unit 1200 may be replaced with the sending unit. When performing a receiving action, the transceiver unit 1200 may be replaced with the receiving unit.

Optionally, the apparatus 1000 may be a terminal device, or a device, a component, or the like that is in the terminal device and that can implement a function of the terminal device in the foregoing method embodiments.

For example, the transceiver unit 1200 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 1100 may be a processing apparatus or a processor. This is not limited herein.

Optionally, the apparatus 1000 may be a circuit system installed in the terminal device, for example, a chip or a system on chip (SoC). The processing unit 1100 and the transceiver unit 1200 each may be one module or unit of the circuit system, or all functions of the processing unit 1100 and the transceiver unit 1200 may be implemented by using one module or unit. In this implementation, the transceiver unit 1200 may be a communications interface. For example, the transceiver unit 1200 may be an input/output interface or an input/output circuit. The input/output interface may include an input interface and an output interface. The input/output circuit may include an input circuit and an output circuit.

A function of the processing apparatus in the foregoing apparatus embodiment may be implemented by hardware, or may be implemented by hardware executing corresponding software.

For example, the processing apparatus may include one or more memories and one or more processors. The one or more memories are configured to store a computer program. The one or more processors read and execute the computer program stored in the one or more memories, so that the apparatus 1000 performs operations and/or processing performed by the terminal device in the method embodiments.

Optionally, the processing apparatus may include only the processor, and the memory configured to store the computer program is located outside the processing apparatus. The processor is connected to the memory through a circuit/wire to read and execute the computer program stored in the memory.

Optionally, the transceiver unit 1200 may be a radio frequency apparatus.

Figure 12:
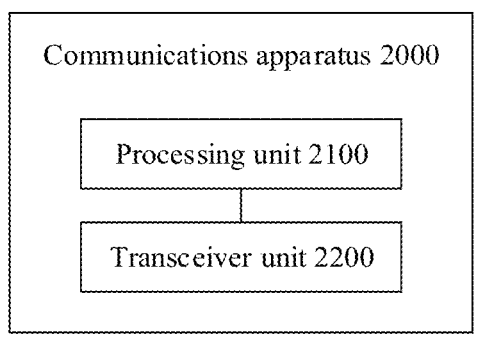
FIG. 12 is a schematic diagram of a structure of a communications apparatus 2000 according to this application.

FIG. 12 is a schematic block diagram of a communications apparatus 2000 according to this application. As shown in FIG. 12, the communications apparatus 2000 includes a processing unit 2100 and a transceiver unit 2200.

The transceiver unit 2200 is configured to send a synchronization signal/PBCH block (SSB) through a service link. The SSB includes a first message and a second message. The first message includes an SSB of a source gateway. The second message includes an SSB of at least one candidate target gateway. The transceiver unit 2200 is further configured to receive a measurement result. The measurement result includes a measurement value of channel quality corresponding to the SSB of the at least one candidate target gateway, measured by a terminal device based on the second message. The transceiver unit 2200 is further configured to send the measurement result. The transceiver unit 2200 is further configured to receive a handover instruction. The handover instruction includes gateway handover information determined by the source gateway based on the measurement result. The handover instruction is used to indicate whether to hand over the terminal device from the source gateway to one of the at least one candidate target gateway. The transceiver unit 2200 is further configured to send the handover instruction.

Optionally, the transceiver unit 2200 is configured to send the first message and the second message in a time division multiplexing or frequency division multiplexing mode through the service link.

Optionally, the measurement result further includes a measurement value of channel quality corresponding to the SSB of the source gateway that is obtained by the terminal device based on the first message.

Optionally, the second message includes priority information of a cell. The cell is a corresponding cell for broadcasting the SSB in the second message, and the cell is a cell covered by the service link.

Optionally, the transceiver unit 2200 is further configured to send synchronization information. The synchronization information is used for time synchronization between the terminal device and the target gateway.

Optionally, the synchronization information includes a delay difference between feeder links of the source gateway and the target gateway, and/or a timing difference for sending a signal by the source gateway and by the target gateway.

Optionally, the transceiver unit 2200 is configured to send the synchronization information in a broadcast, multicast, or unicast manner.

Optionally, the transceiver unit 2200 is further configured to send measurement configuration information. The measurement configuration information includes one or more pieces of the following information: time-frequency information of the SSB of the at least one candidate target gateway, a time domain period of the SSB of the at least one candidate target gateway, and a time-frequency resource for reporting the measurement result.

Optionally, the transceiver unit 2200 may alternatively be replaced with a sending unit or a receiving unit. For example, when performing a sending action, the transceiver unit 2200 may be replaced with the sending unit. When performing a receiving action, the transceiver unit 2200 may be replaced with the receiving unit.

Optionally, the apparatus 2000 may be a network device, or a device, a component, or the like that is in the network device and that can implement a function of the terminal device in the foregoing method embodiments.

For example, the transceiver unit 2200 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 2100 may be a processing apparatus or a processor. This is not limited herein.

Optionally, the apparatus 2000 may be a circuit system installed in the network device, for example, a chip or an SoC. The processing unit 2100 and the transceiver unit 2200 each may be one module or unit of the circuit system, or all functions of the processing unit 2100 and the transceiver unit 2200 may be implemented by using one module or unit. In this implementation, the transceiver unit 2200 may be a communications interface. For example, the transceiver unit 2200 may be an input/output interface or an input/output circuit. The input/output interface may include an input interface and an output interface. The input/output circuit may include an input circuit and an output circuit.

A function of the processing apparatus in the foregoing communications apparatus embodiment may be implemented by hardware, or may be implemented by hardware executing corresponding software.

For example, the processing apparatus may include one or more memories and one or more processors. The one or more memories are configured to store a computer program. The one or more processors read and execute the computer program stored in the one or more memories, so that the apparatus 2000 performs operations and/or processing performed by the network device in the method embodiments.

Optionally, the processing apparatus may include only the processor, and the memory configured to store the computer program is located outside the processing apparatus. The processor is connected to the memory through a circuit/wire to read and execute the computer program stored in the memory.

Optionally, the transceiver unit 2200 may be a radio frequency apparatus.

Figure 13:
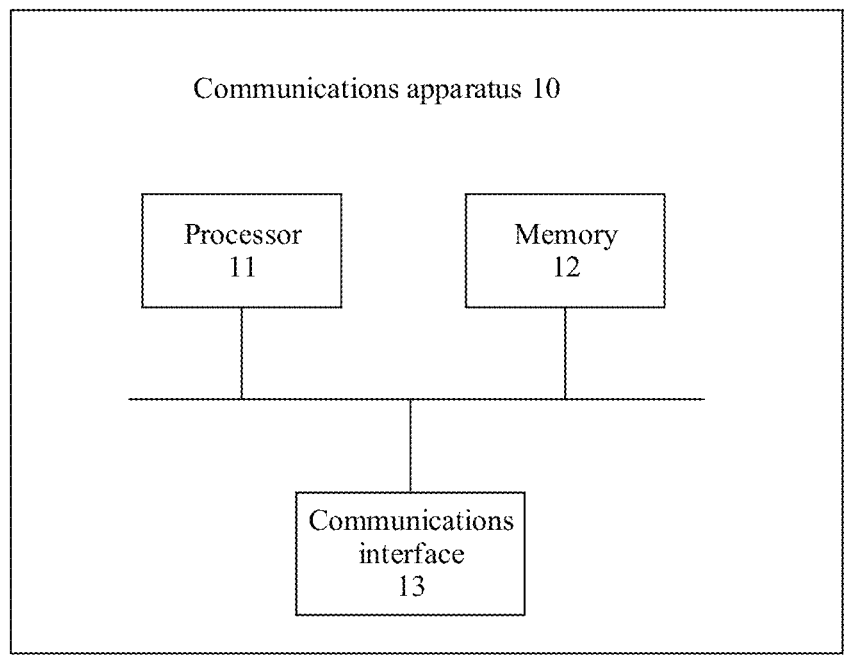
FIG. 13 is a schematic diagram of a structure of a communications apparatus 10 according to this application.

FIG. 13 is a schematic diagram of a structure of a communications apparatus 10 according to this application. As shown in FIG. 13, the communications apparatus 10 includes one or more processors 11, one or more memories 12, and one or more communications interfaces 13. The processor 11 is configured to control the communications interface 13 to receive and send a signal. The memory 12 is configured to store a computer program. The processor 11 is configured to invoke the computer program from the memory 12 and run the computer program, so that the communications apparatus 10 performs processing and/or operations performed by the terminal device in the method embodiments of this application.

For example, the processor 11 may integrate a function of the processing unit 1100 in FIG. 11, and the communications interface 13 may have a function of the transceiver unit 1200 shown in FIG. 11. For details, refer to detailed descriptions in FIG. 11. Details are not described herein again.

Optionally, when the apparatus 10 is a terminal device, the processor 11 may be a baseband apparatus installed in the terminal device, and the communications interface 13 may be a radio frequency apparatus.

Optionally, in the foregoing apparatus embodiments, the memory and the processor may be physically independent units, or the memory and the processor may be integrated together.

Figure 14:
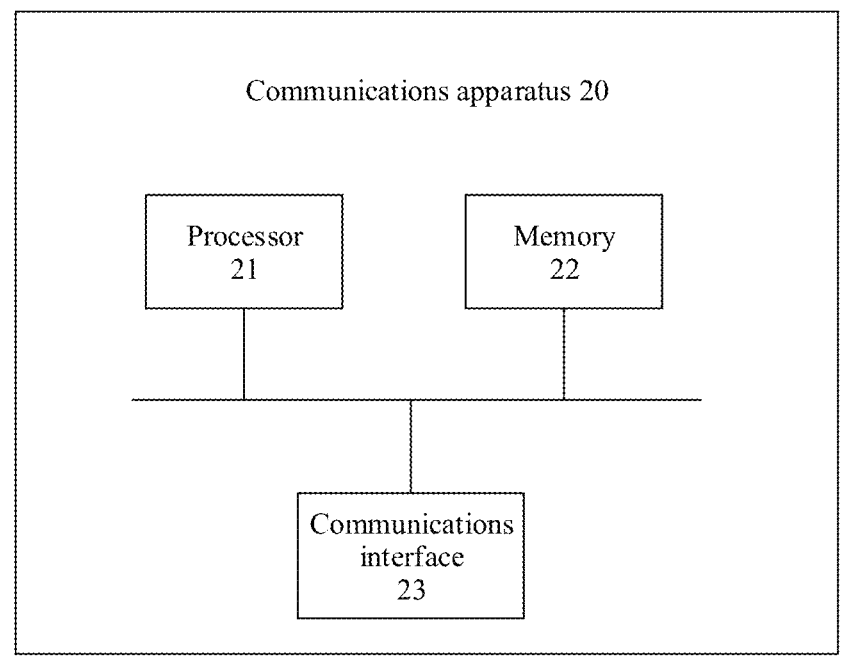
FIG. 14 is a schematic diagram of a structure of a communications apparatus 20 according to this application.

FIG. 14 is a schematic diagram of a structure of a communications apparatus 20 according to this application. As shown in FIG. 14, the communications apparatus 20 includes one or more processors 21, one or more memories 22, and one or more communications interfaces 23. The processor 21 is configured to control the communications interface 23 to receive and send a signal. The memory 22 is configured to store a computer program. The processor 21 is configured to invoke the computer program from the memory 22 and run the computer program, so that the communications apparatus 20 performs processing and/or operations performed by the network device in the method embodiments of this application.

For example, the processor 21 may integrate a function of the processing unit 2100 in FIG. 12, and the communications interface 23 may have a function of the transceiver unit 2200 shown in FIG. 12. For details, refer to detailed descriptions in FIG. 12. Details are not described herein again.

Optionally, when the apparatus 20 is a network device, the processor 21 may be a baseband apparatus installed in the network device, and the communications interface 23 may be a radio frequency apparatus.

Optionally, in the foregoing apparatus embodiments, the memory and the processor may be physically independent units, or the memory and the processor may be integrated together.

In addition, this application further provides a computer-readable storage medium. The computer-readable storage medium stores computer instructions. When the computer instructions are run on a computer, the computer is enabled to perform operations and/or processing performed by the terminal device in the gateway handover method provided in this application.

This application further provides a computer-readable storage medium. The computer-readable storage medium stores computer instructions. When the computer instructions are run on a computer, the computer is enabled to perform operations and/or processing performed by the network device in the gateway handover method provided in this application.

This application further provides a computer program product. The computer program product includes computer program code. When the computer program code is run on a computer, the computer is enabled to perform operations and/or processing performed by the terminal device in the gateway handover method provided in this application.

This application further provides a computer program product. The computer program product includes computer program code. When the computer program code is run on a computer, the computer is enabled to perform operations and/or processing performed by the network device in the gateway handover method provided in this application.

This application further provides a communications apparatus, including a processor and an interface circuit. The interface circuit is configured to receive computer code or instructions, and transmit the computer code or instructions to the processor. The processor is configured to run the computer code or instructions, to perform operations and/or processing performed by the terminal device in the gateway handover method provided in this application.

This application further provides a communications apparatus, including a processor and an interface circuit. The interface circuit is configured to receive computer code or instructions, and transmit the computer code or instructions to the processor. The processor is configured to run the computer code or instructions, to perform operations and/or processing performed by the network device in the gateway handover method provided in this application.

This application further provides a chip. The chip includes one or more processors. The one or more processors are configured to execute a computer program stored in a memory, to perform operations and/or processing performed by the terminal device in any method embodiment. The memory configured to store the computer program is disposed independently of the chip.

Further, the chip may further include one or more communications interfaces. The one or more communications interfaces may be an input/output interface, an input/output circuit, or the like.

Further, the chip may further include one or more memories.

This application further provides a chip. The chip includes one or more processors. The one or more processors are configured to execute a computer program stored in a memory, to perform operations and/or processing performed by the network device in any method embodiment. The memory configured to store the computer program is disposed independently of the chip.

Further, the chip may further include one or more communications interfaces. The one or more communications interfaces may be an input/output interface, an input/output circuit, or the like.

Further, the chip may further include one or more memories.

This application further provides a communications system, including the terminal device and the network device in embodiments of this application.

The processor in embodiments of this application may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or may be any conventional processor or the like. The steps of the methods disclosed in embodiments of this application may be directly executed and completed by using a hardware encoding processor, or may be executed and completed by using a combination of hardware and software modules in an encoding processor. A software module may be located in a storage medium mature in the art, such as a random access memory, a flash memory, a read-only memory, a programmable read-only memory, an electrically erasable programmable memory, a register, or the like. The storage medium is located in a memory, and the processor reads information in the memory and completes the steps in the foregoing methods in combination with hardware of the processor.

The memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these and any memory of another proper type.

The terms such as "unit", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using the figures, both an application and a computing device that runs on the computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or another network, such as the Internet for interacting with another system by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions of each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or another form.

The units described as separate parts may or may not be physically separate, and parts displayed as units may or may not be physical units, and may be located in one position, or may be distributed on a plurality of network units. A part or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to a conventional technology, or the part of the technical solutions may be implemented in a form of a software product. The computer software product is stored in a storage medium, and includes several instructions for instructing a computer device (which may be a personal computer, a server, a network device, or the like) to perform all or a part of the steps of the methods in embodiments of this application. The foregoing storage medium includes: any medium that can store program code, such as a USB flash drive, a removable hard disk, a read-only memory, a random access memory, a magnetic disk, or an optical disc.

The foregoing description is merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A gateway handover method, comprising:
receiving, by a terminal device, a first message and a second message through a same service link, wherein the first message comprises a synchronization signal/physical broadcast channel block (SSB) of a source gateway, and the second message comprises an SSB of at least one candidate target gateway;
obtaining, by the terminal device, a measurement result based on the second message, wherein the measurement result comprises a measurement value of channel quality corresponding to the SSB of the at least one candidate target gateway;
sending, by the terminal device, the measurement result;
receiving, by the terminal device, a handover instruction, wherein the handover instruction comprises gateway handover information; and
determining, by the terminal device based on the handover instruction, whether to be handed over from the source gateway to a target gateway, wherein the target gateway is one of the at least one candidate target gateway.

2. The method according to claim 1, wherein the first message and the second message are sent in a time division multiplexing or frequency division multiplexing mode through the same service link.

3. The method according to claim 1, wherein the measurement result further comprises a measurement value of channel quality corresponding to the SSB of the source gateway, that is obtained by the terminal device based on the first message.

4. The method according to claim 1, wherein the second message further comprises priority information of a cell, the cell is a corresponding cell for broadcasting the SSB of the at least one candidate target gateway in the second message, and the cell is a cell covered by the service link; and
selecting, by the terminal device based on the priority information of the cell, one of the at least one candidate target gateway, to perform a gateway handover.

5. The method according to claim 1, wherein if the terminal device determines to be handed over from the source gateway to the target gateway, before the handover, the method further comprises:
receiving, by the terminal device, synchronization information, wherein the synchronization information is used for time synchronization between the terminal device and the target gateway.

6. The method according to claim 5, wherein the synchronization information comprises at least one of:
a delay difference between feeder links of the source gateway and the target gateway, or
a timing difference for sending a signal to a network device by the source gateway and by the target gateway.

7. The method according to claim 5, wherein the terminal device receives the synchronization information in a broadcast, multicast, or unicast manner.

8. The method according to claim 1, wherein the method further comprises:
receiving, by the terminal device, measurement configuration information, wherein the measurement configuration information comprises one or more pieces of the following information:
time-frequency information of the SSB of the at least one candidate target gateway, a time domain period of the SSB of the at least one candidate target gateway, and a time-frequency resource for reporting the measurement result.

9. A gateway handover method, comprising:
sending, by a network device, a first message and a second message through a same service link, wherein the first message comprises a synchronization signal/physical broadcast channel block (SSB) of a source gateway, and the second message comprises an SSB of at least one candidate target gateway;
receiving, by the network device, a measurement result, wherein the measurement result comprises a measurement value of channel quality corresponding to the SSB of the at least one candidate target gateway, measured by a terminal device based on the second message;
forwarding, by the network device, the measurement result;
receiving, by the network device, a handover instruction, wherein the handover instruction comprises gateway handover information determined by the source gateway based on the measurement result, and the handover instruction is used to indicate whether to hand over the terminal device from the source gateway to a target gateway, wherein the target gateway is one of the at least one candidate target gateway; and
sending, by the network device, the handover instruction.

10. The method according to claim 9, wherein the sending, by the network device, the first message and the second message through the same service link comprises:
sending, by the network device, the first message and the second message in a time division multiplexing or frequency division multiplexing mode through the same service link.

11. The method according to claim 9, wherein the measurement result further comprises a measurement value of channel quality corresponding to the SSB of the source gateway that is obtained by the terminal device based on the first message.

12. The method according to claim 9, wherein the second message comprises priority information of a cell for broadcasting the SSB in the second message, and the cell is covered by the service link.

13. The method according to claim 9, wherein the method further comprises:
sending, by the network device, synchronization information, wherein the synchronization information is used for time synchronization between the terminal device and the target gateway.

14. The method according to claim 13, wherein the synchronization information comprises at least one of:
a delay difference between feeder links of the source gateway and the target gateway, or
a timing difference for sending a signal to the network device by the source gateway and by the target gateway.

15. The method according to claim 13, wherein the network device sends the synchronization information in a broadcast, multicast, or unicast manner.

16. The method according to claim 9, wherein the method further comprises:
sending, by the network device, measurement configuration information, wherein the measurement configuration information comprises one or more pieces of the following information:
time-frequency information of the SSB of the at least one candidate target gateway, a time domain period of the SSB of the at least one candidate target gateway, and a time-frequency resource for reporting the measurement result.

17. A terminal device comprising a processor, wherein the terminal device is configured to perform:
receiving a first message and a second message through a same service link, wherein the first message comprises a synchronization signal/physical broadcast channel block (SSB) of a source gateway, and the second message comprises an SSB of at least one candidate target gateway;
obtaining a measurement result based on the second message, wherein the measurement result comprises a measurement value of channel quality corresponding to the SSB of the at least one candidate target gateway;
sending the measurement result;
receiving a handover instruction, wherein the handover instruction comprises gateway handover information determined by the source gateway based on the measurement result; and
determining based on the handover instruction, whether to be handed over from the source gateway to one of the at least one candidate target gateway.

18. The terminal device according to claim 17, wherein the first message and the second message are sent in a time division multiplexing or frequency division multiplexing mode through the same service link.

19. The terminal device according to claim 17, wherein the measurement result further comprises a measurement value of channel quality corresponding to the SSB of the source gateway, that is obtained by the terminal device based on the first message.

20. The terminal device according to claim 17, wherein the second message further comprises priority information of a cell, the cell is a corresponding cell for broadcasting the SSB of the at least one candidate target gateway in the second message, and the cell is a cell covered by the service link; and selecting, based on the priority information of the cell, one of the at least one candidate target gateway, to perform a gateway handover.

* * * * *